United States Patent
Brudy

[15] 3,657,045
[45] Apr. 18, 1972

[54] METHOD OF FABRICATING FACETED PIN BUNDLES FOR MOLDING CENTRAL TRIPLE REFLECTORS

[72] Inventor: Otto Brudy, 559 Askin Boulevard, Windsor 11, Ontario, Canada

[22] Filed: Nov. 24, 1969

[21] Appl. No.: 879,096

[30] Foreign Application Priority Data

July 10, 1969 Great Britain.....................34,891/69

[52] U.S. Cl..................................156/296, 18/44, 156/63, 350/103, 350/320, 156/330, 156/242
[51] Int. Cl. ....................................B29c 27/00, G02b 5/12
[58] Field of Search..............156/63, 296; 350/97, 106, 109, 350/102, 103, 320; 18/44; 264/1

[56] References Cited

UNITED STATES PATENTS

| | | |
|---|---|---|
| 595,274 | 12/1897 | Soper..........................................18/44 |
| 1,591,572 | 7/1926 | Stimson..................................350/102 |
| 1,906,655 | 5/1933 | Stimson..............................350/103 X |
| 2,022,639 | 11/1935 | Stimson................................350/103 |
| 2,831,394 | 4/1958 | Heenan et al.......................350/103 X |
| 3,069,721 | 12/1962 | Arni et al............................350/102 X |
| 3,258,840 | 7/1966 | Hedgewick et al................156/296 X |
| 3,277,535 | 10/1966 | Rupert.........................................18/44 |
| 3,355,273 | 11/1967 | Siegmund et al..................156/296 X |
| 3,417,959 | 12/1968 | Schultz..............................350/102 X |
| 3,443,281 | 5/1969 | Walby.........................................18/44 |

Primary Examiner—Carl D. Quarforth
Assistant Examiner—Roger S. Gaither
Attorney—Thomas T. Rieder

[57] ABSTRACT

A method of fabricating a core for molding central triple reflectors. A number of hexagonal, cubically faceted pins are assembled into a bundle, and clamped into a mold so that the mold walls and the bottom ends of the pins define a recess. A quantity of binding material is placed in the recess and then is compressed against the bottom ends of the pins to drive some of the binding material between the individual pins. The binding material is then hardened and bonds the bundle of pins together.

4 Claims, 8 Drawing Figures

PATENTED APR 18 1972 3,657,045
SHEET 1 OF 2
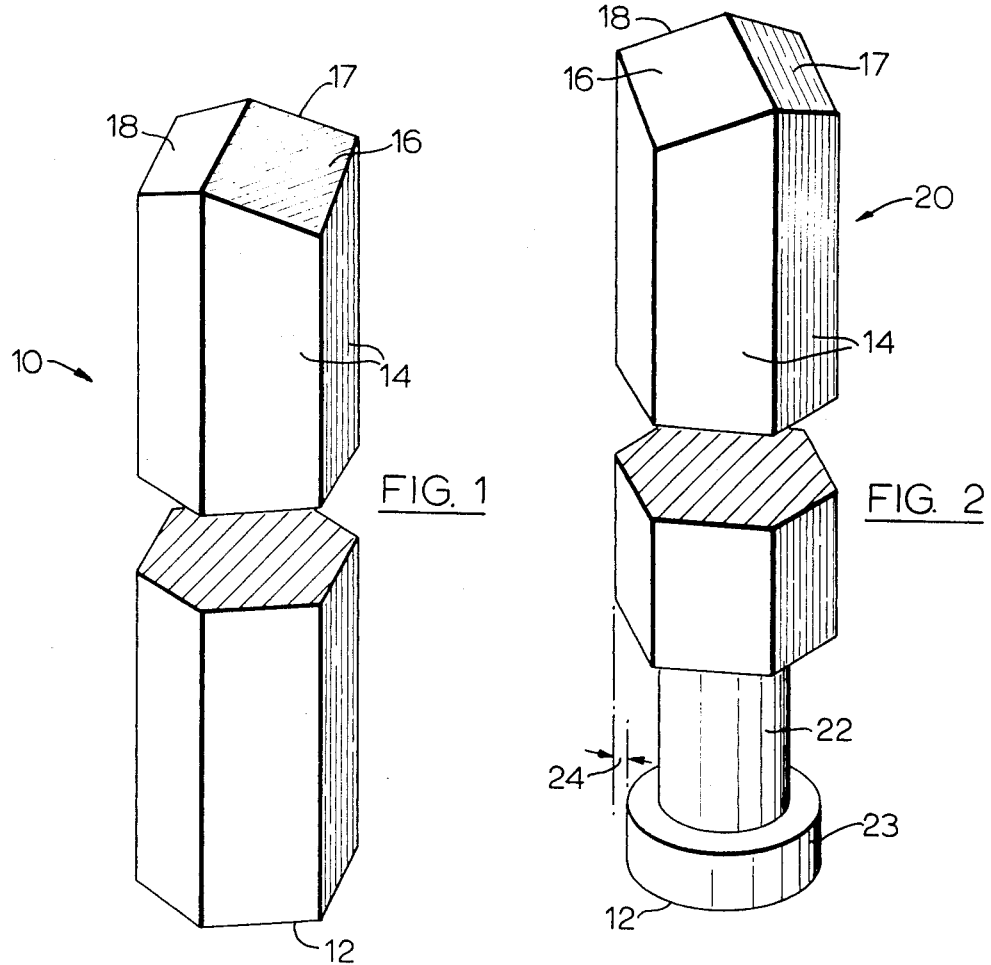
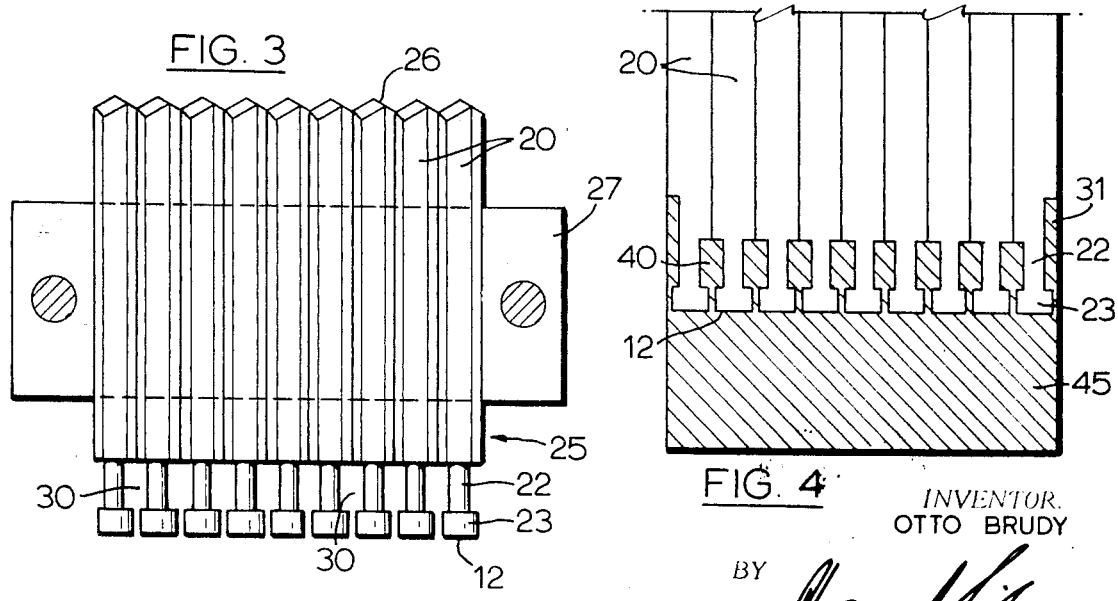
INVENTOR.
OTTO BRUDY

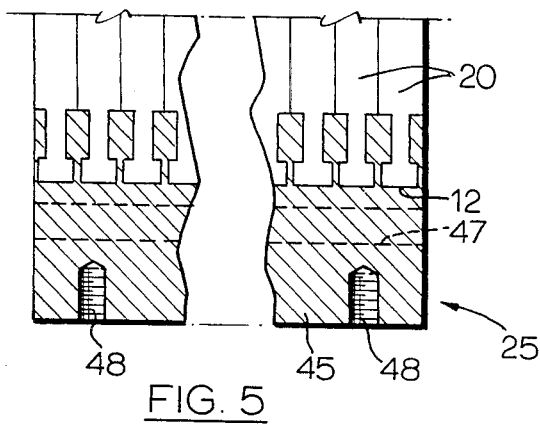
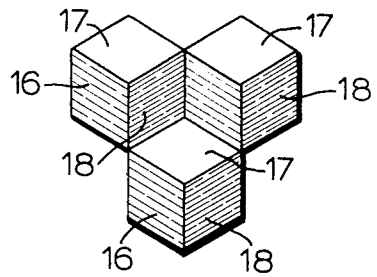
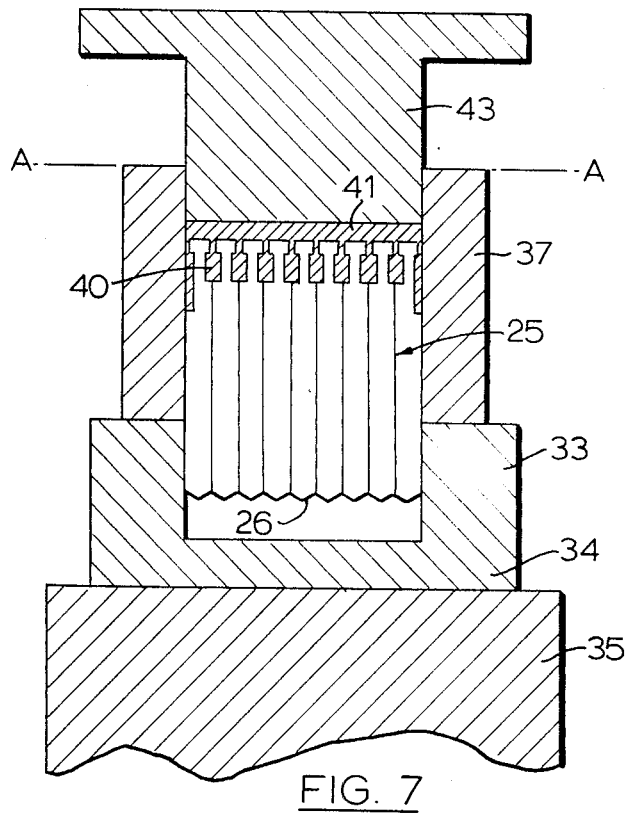
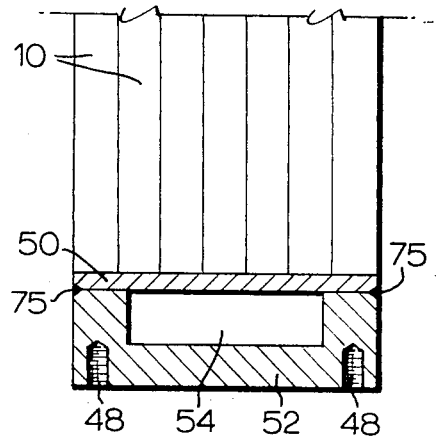

METHOD OF FABRICATING FACETED PIN BUNDLES FOR MOLDING CENTRAL TRIPLE REFLECTORS

This invention relates to the manufacture of reflectors commonly referred to as central triple reflectors, the nature of which is such as to reflect light back towards the source of the light, provided the path of incident light is not too wide of normal to the face of the reflector. Such reflectors are also sometimes referred to as retrodirective reflectors. The usual construction of such retrodirective reflectors includes a smooth outer surface (flat or curved) and in accurately formed inner surface constituted by reflecting surfaces or facets that intersect one another preferably at 90° angles in the form of cubic corners or prisms. Those familiar with the art will be well acquainted with this particular kind of prismic or faceted surface. Reflectors of this type are of particular use in automotive vehicles, along highways and airfield landing strips, and at other locations where they are useful as guides, indicators, or danger signals.

In order to permit the manufacture of such retrodirective reflectors, the standard procedure has been to provide a number of hexagonal metal rods having three substantially square facets ground and polished at one end, each facet being perpendicular to both other facets. Thus, the three facets define three contiguous faces of a cube. A large number of such hexagonal faceted metal pins is locked together to form a core with the points of all of the hexagonal pins lying substantially in the same plane, and a clear plastic, such as clear acrylic, is molded against the multiplicity of facets provided by the core, to provide a flat molded item having one surface smooth and the other surface faceted precisely complementally to the facets of the core One disadvantage of prior art methods of assembling the pins together relates to the difficulty, particularly when the pin are of small section, of accurately positioning the pins both longitudinally and in proper lateral orientation. Another difficulty relates to the build-up of heat in the core due to the frequency of sequential molding operations. It is desirable to provide for a rapid dissipation of the heat transmitted to the core, because such a means would increase the permissible frequency of operation of the tool by decreasing the time required for proper setting of the product prior to ejection from the tool.

Previous methods for assembling the core bodies have not incorporated any cooling means, since the rods were either merely mechanically clamped together, or were fusion welded at their bases.

It is therefore an object of this invention to provide a core construction in which the individual hexagonal rods are permanently bonded together, and in which the core can be cooled by a circulating cooling fluid.

The grinding and polishing of the cubical facets at the end of the hexagonal rods is taught in U.S. Pat. No. 2,056,491, issued Oct. 6, 1936 to J.C. Stimson, entitled "Apparatus for Making Reflectors." As mentioned above, one of the preferred arrangements is to make each facet square, and perpendicular to the other two facets. With such an arrangement, the angle between each facet and the axis of the hexagonal pin will be substantially 35° 16'.

One recent innovation in this field has been the development of a process which results in a bundle of hexagonal pins fastened together at their bases by means of fusion welding, or the like. However, this process has a number of significant disadvantages, particularly relating to the lack of support along the columnar length of the individual rods, and the difficulties caused by over-heating, since thermal stress could easily cause cracking in the welding zone and produce an insecure core.

This invention overcomes the above drawbacks and difficulties of the conventional construction by providing, essentially a core in which the individual hexagonal pins are bonded together over an appreciable portion of their length by a bonding material, resulting in a solid mass which can then be drilled to form passageways through which a coolant can be circulated to achieve rapid removal of the heat developed by the repeated molten plastic injections.

More specifically, this invention provides a method of fabricating a core for molding central triple reflectors, said method comprising the steps: providing a plurality of hexagonal pins, each having optical cubical facets at one end; assembling said plurality of hexagonal pins together into a bundle such that the optical cubical facets provide a faceted surface against which central triple reflectors may be molded; clamping said bundle into a mold such that the mold walls and the other ends of the hexagonal pins define a recess of which said other ends constitute the base; placing in the recess a quantity of binding material in a plastic or liquid state; compressing said binding material against said other ends, thereby to drive some of the binding material between the individual hexagonal pins; causing the binding material to harden; and removing the bonded bundle of hexagonal pins from the mold.

Three embodiments of this invention are shown in the accompanying drawings, in which like numerals denote like parts throughout the several views, and in which:

FIG. 1. is a perspective view of a faceted hexagonal rod utilized in this invention;

FIG. 2 is a perspective view of a modified hexogonal rod, especially adapted for use with the method of this invention;

FIG. 3 is a sectional view of a portion of the apparatus used in this invention;

FIG. 4 is a sectional view of the first embodiment of a completed core assembly manufactured in accordance with this invention;

FIG. 5 is a sectional view of a second embodiment of a completed core assembly manufactured in accordance with this invention;

FIG. 6 is a plan view of three inter-fitted hexagonal faceted rods of the kind depicted in FIG. 2;

FIG. 7 is a sectional view of an apparatus utilized in the method of this invention; and FIG. 8 is a sectional view of a third embodiment of a completed core manufactured in accordance with this invention.

FIG. 1 shows a hexagonal rod 10 of the kind that is normally utilized in the fabrication of central triple reflectors. The rod 10 has a flat base 12, six hexagonal side faces 14, and three substantially square, highly polished optical facets 16, 17 and 18. In the most widely used form, the facets 16, 17 and 18 are all mutually perpendicular, and thus constitute three adjacent faces of a hypothetical cube. It will be appreciated that, when a number of such hexagonal, faceted rods 10 are juxtaposed as shown in FIG. 6 with their side faces 14 in face-to-face relation, a surface is formed by the facets 16, 17 and 18 against which plastic can be molded in such a way that the plastic surface picks up the shape of the facets. Usually, the index of refraction of the clear plastic material used is such that for small angles of incidence, total internal reflection takes place at the plastic facets, the resultant ray being parallel with the incident ray.

As mentioned above, one recent innovation is to form a core by fusion-welding the bases of a plurality of such hexagonal rods together.

In FIG. 2 is shown a modified hexagonal rod 20. The upper end of the hexagonal rod has facets 16, 17 and 18, as in FIG. 1, but the lower end of the rod 20 has been undercut to the shape of an integral coaxial shaft 22, having a plug-end 23 at its lower end integral therewith. The plug-end 23 is cylindrical in shape, as is the coaxial shaft 22, but it will be appreciated from what follows that this precise shape is not essential to the invention. In the preferred form of the hexagonal rod 20, however, the plug-end 23 has a diameter smaller than the diametral edge-to-edge dimension of the hexagonal rod 20. One-half of this difference is shown at 24.

In FIG. 3 is shown a plurality of modified hexagonal rods 20 constituting a core 25 which defines, at the upper end, a faceted surface 26 by virtue of the multiplicity of individual square optical facets 16, 17 and 18 on each of the individual modified hexagonal rods 20. The hexagonal rods 20 in FIG. 3 are assembled in the proper relation, and are maintained in this relation by a mechanical clamping device 27, which has been shown only schematically in FIG. 3, as it will be familiar to all those acquainted with this field. When the modified hexagonal rods 20 are in the relationship shown in FIG. 3, their lower ends are aligned to form a plurality of recesses 30 between the shafts 22 and the plug ends 23 of the hexagonal rods 20.

When the hexagonal rods 20 are clamped in position as shown in FIG. 3, it is possible, if desired, to form grooves 31 (see FIG. 4) around the outermost rods 20.

The core 25 of modified hexagonal rods 20 is then placed upside-down within a surrounding pre-formed ring 33 which is secured to a flat base 34 mounted on a supporting structure 35. The last three elements named are shown schematically only, as are the other elements in FIG. 7. Once the upper ends of the hexagonal rods 20 have been inserted downwardly into the ring 33, the clamping device 27 is removed and a further ring 37 is placed around the core 25 in tightly clamping relationship. A binding material 40 is then placed in the open area 41, and a compressor block 43 is forced into the interior of the ring 37 against the binding material 40, thereby compressing the material 40 and driving it into all the cracks and crevices in the upper ends of the hexagonal rods 20 forming the core 25. Preferably, the supporting structure 35 and the compressor block 43 are the components of a standard press. Preferably, the binding material 40 is a partially metallic and partially epoxy substance, such as those usually referred to as plastic metal. Many commercially available grades of plastic metal provide suitable shear, tear and impact strengths, and offer workable temperature ranges far beyond the requirements for an acrylic molding tool.

The method thus far described could be terminated at this point, to result in a core 25 of which the individual hexagonal rods 20 are very firmly bonded together over a large portion of their lower ends.

If, however, it is desired to provide cooling passageways to remove heat from the surface 26, the amount of binding material 40 is increased to near the level of the line A—A, and the result will be a core having the cross-section shown in FIG. 4. After the binding material 40 has completely set, the base 45 can be drilled to provide one or more coolant passages 47, and tapped openings 48, the latter being adapted to secure the core to a suitable base in preparation for molding of the central triple reflectors.

It will be appreciated that the coolant passages 47 could be drilled above the level of the bottoms 12 of the hexagonal rods 20, provided the binding material 40 had sufficiently penetrated upwardly along the interstices between the prism faces 14 of the individual hexagonal rods 20.

It will also be appreciated that, so far as the advantage of cooling passages is concerned, it would be possible to merely fusion-weld the bases of the individual unmodified hexagonal rods 10 (FIG. 1) together in accordance with the recent innovation discussed above, and thereafter to form an extended or auxiliary base against the fusion-welding area, in which auxiliary base one or more coolant passages could be drilled, in the manner shown in FIG. 5. FIG. 8 shows such an arrangement, wherein hexagonal rods 10 have been fusion-welded to form a layer 50, against which a base 52 has been formed in the manner shown in FIG. 7. The base 52 can then be provided with a passage or passages 54 and tapped openings 48, as discussed above.

The embodiment shown in FIG. 8 is not the preferred embodiment of the invention because the welded layer 50, which acts as heat exchanger between the hexagonal rods 10 and the passage 54, may be thermally stressed to the point where there is a risk of cracking in the weld. This risk could be reduced by arranging the passage (or passages) 54 in such a way that part of the base 52 intervened between the passage 54 and the welded layer 50, although the welded layer 50 would still remain the most critical area as far as thermal stress is concerned.

Because of the risk of undesirable thermal stress in the third embodiment, the first two embodiments are the preferred ones.

What I claim as my invention is:

1. A method of fabricating a core for molding central triple reflectors, said method comprising the steps:
   providing a plurality of hexagonal pins each having optical cubical facets at one end and a reduced portion adjacent the other end,
   assembling said plurality of hexagonal pins together into a bundle such that the optical cubical facets provide a faceted surface against which central triple reflectors may be molded, SAID PLURALITY OF HEXAGONAL PINS TOGETHER INTO A BUNDLE SUCH THAT THE OPTICAL CUBICAL FACETS PROVIDE A FACETED SURFACE AGAINST WHICH CENTRAL TRIPLE REFLECTORS MAY BE MOLDED,
   clamping and rigidly securing said bundle into a mold such that the mold walls and the other ends of the hexagonal pins define a recess of which said other ends constitute the base,
   placing in the recess a quantity of binding material in a plastic or liquid state,
   compressing said binding material against said other ends, thereby driving some of the binding material into the reduced portions between each of the individual hexagonal pins,
   causing the binding material to harden and grip the hexagonal pins securely together as a bonded bundle, and
   removing the bonded bundle of hexagonal pins from the mold 2. A method as claimed in claim 1, in which the step of removing the bonded bundle from the mold is followed by the step of providing coolant passages in the hardened mass of binding material adjacent said other ends of the hexagonal pins.

3. A method as claimed in claim 1, in which the reduced portion includes a cylindrical coaxial shaft having an enlargement at its end remote from said one end.

4. A method as claimed in claim 1, in which said binding material is plastic metal.

* * * * *